United States Patent
Takeshita et al.

(10) Patent No.: US 9,885,915 B2
(45) Date of Patent: Feb. 6, 2018

(54) LIQUID CRYSTAL DISPLAY

(71) Applicant: Samsung Display Co. Ltd., Yongin (KR)

(72) Inventors: Fusayuki Takeshita, Seoul (KR); Jae Jin Lyu, Yongin-si (KR); Keun Chan Oh, Hwaseong-si (KR); Jin Hyeong Lee, Hwaseong-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/342,304

(22) Filed: Nov. 3, 2016

(65) Prior Publication Data

US 2017/0146861 A1 May 25, 2017

(30) Foreign Application Priority Data

Nov. 4, 2015 (KR) .................. 10-2015-0154575

(51) Int. Cl.
*G02F 1/1343* (2006.01)
*G02F 1/1337* (2006.01)
*G02F 1/1335* (2006.01)

(52) U.S. Cl.
CPC .. *G02F 1/133707* (2013.01); *G02F 1/134363* (2013.01); *G02F 2001/133548* (2013.01); *G02F 2001/133738* (2013.01); *G02F 2201/121* (2013.01); *G02F 2201/123* (2013.01)

(58) Field of Classification Search
CPC ......... G02F 1/133707; G02F 1/134363; G02F 2001/133738; G02F 2201/123; G02F 2001/133548; G02F 2201/121
See application file for complete search history.

(56) References Cited

U.S. PATENT DOCUMENTS 9,513,516 B2 * 12/2016 Matsushima ..... G02F 1/134363

FOREIGN PATENT DOCUMENTS

| JP | 5192046 | 5/2013 |
|----|---------|--------|
| JP | 2013109309 | 6/2013 |
| JP | 2013195537 | 9/2013 |
| JP | 2014071309 | 4/2014 |
| JP | 2014102499 | 6/2014 |
| JP | 2014191109 | 10/2014 |
| JP | 2014199313 | 10/2014 |
| JP | 2014206639 | 10/2014 |

(Continued)

*Primary Examiner* — Donald Raleigh
(74) *Attorney, Agent, or Firm* — Cantor Colburn LLP

(57) ABSTRACT

A liquid crystal display includes a first substrate including a thin-film transistor ("TFT") disposed in a unit pixel, a first electrode connected to the TFT, and a second electrode disposed on the same layer as that on which the first electrode is disposed, a second substrate facing the first substrate, and a liquid crystal layer between the first and second substrates, where the first and second electrodes include a first wiring electrode and a second wiring electrode, respectively disposed on sides of the unit pixel, first main electrodes and second main electrodes, respectively branched off from at least one of the first wiring electrode and the second wiring electrode in a first direction and are arranged in a staggered manner, and first slit electrodes and second slit electrodes, respectively, which are arranged in a second direction perpendicular to the first direction and are arranged in a staggered manner.

20 Claims, 11 Drawing Sheets

(56) References Cited

FOREIGN PATENT DOCUMENTS

| | | |
|---|---|---|
| JP | 2014209212 | 11/2014 |
| JP | 2014209228 | 11/2014 |
| JP | 5735731 | 4/2015 |
| KR | 100623984 | 9/2006 |

* cited by examiner

LIQUID CRYSTAL DISPLAY

This application claims priority to Korean Patent Application No. 10-2015-0154575, filed on Nov. 4, 2015, and all the benefits accruing therefrom under 35 U.S.C. § 119, the content of which in its entirety is herein incorporated by reference.

BACKGROUND

1. Field

Exemplary embodiments of the invention relate to a liquid crystal display ("LCD").

2. Description of the Related Art

A liquid crystal display ("LCD") is one of the most widely used flat panel displays. An LCD generally includes two display panels, on which field-generating electrodes such as a pixel electrode and a common electrode are formed, and a liquid crystal layer which is interposed between the two display panels.

Due to a voltage applied to the field-generating electrodes, an electric field is applied. Due to the electric field, an alignment of liquid crystal molecules may be adjusted so as to control a transmittance and a polarization of incident light. As a result, an image is displayed.

In-Plane Switching ("IPS") is one of the most representative LCD technologies for realizing a wide viewing angle. More specifically, an IPS method is a type of liquid crystal driving method in which liquid crystal molecules are rotated in an in-plane direction by a transverse field so as to rotate an effective optical axis in-plane and thus to control the transmittance of an LCD. In the IPS method, a transverse field may be applied using various techniques including forming a pixel electrode and a common electrode on the same substrate.

More specifically, to apply a transverse field to electrodes that are stripe-shaped, a pixel electrode and a common electrode may be disposed on the same plane, or may be formed on the same substrate while disposed on different layers with an insulating layer interposed therebetween.

SUMMARY

Exemplary embodiments of the invention provide a liquid crystal display ("LCD"), which is capable of controlling the formation of disclination lines by providing two electrodes that receive different voltages on the same substrate to form a horizontal field and providing slit electrodes on each of the two electrodes to be arranged in a staggered manner and is thus capable of improving the response speed.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, a liquid crystal display ("LCD") includes a first substrate including a thin-film transistor ("TFT"), which is disposed in a unit pixel, a first electrode, which is connected to the TFT, and a second electrode, which is disposed on the same layer as that on which the first electrode is disposed, a second substrate facing the first substrate, and a liquid crystal layer including liquid crystal molecules, which are disposed between the first and second substrates, where the first and second electrodes are provided with different voltages from each other and include a first wiring electrode and a second wiring electrode, respectively, which are disposed on sides of the unit pixel, first main electrodes and second main electrodes, respectively, which are branched off from the first wiring electrode or the second wiring electrode in a first direction and are arranged in a staggered manner, and first slit electrodes and second slit electrodes, respectively, which are arranged in a second direction perpendicular to the first direction in which the first main electrodes and the second main electrodes extend and are arranged in a staggered manner.

A liquid crystal display ("LCD"), may further include a first polarizing plate disposed on a first side surface of the first substrate where the TFT is disposed, and a second polarizing plate disposed on a first side surface of the second substrate, which is opposite to on a second side surface of the second substrate facing the liquid crystal layer, where the first and second polarizing plates are arranged such that polarization axes of the first and second polarizing plates cross each other at right angles, and the first main electrodes and the second main electrodes extend in a direction of about 40 degrees)(° to about 50° with respect to the polarization axes of the first and second polarizing plates.

In an exemplary embodiment, the first or second electrode may include at least one of indium zinc oxide ("IZO"), indium tin oxide ("ITO"), indium gallium zinc oxide ("IGZO"), and a combination thereof.

In an exemplary embodiment, the TFT may include a gate line disposed in a third direction of the unit pixel, a gate electrode disposed in an area in which the gate line and a data line intersect each other and extending from the gate line, and a source electrode extending from the data line and a drain electrode isolated from the source electrode, and the drain electrode is connected to the first electrode via a contact hole.

In an exemplary embodiment, the first wiring electrode of the first electrode may include a first vertical wiring electrode, which is disposed along a first side of the unit pixel and extends in parallel to the data line, and a first horizontal wiring electrode, which is branched off from the first vertical wiring electrode, extends in parallel to the gate line, and divides the unit pixel into upper and lower regions.

In an exemplary embodiment, the first main electrodes may extend from the first horizontal wiring electrode and first main electrodes extending upwardly from the first horizontal wiring electrode and first main electrodes extending downwardly from the first horizontal wiring electrode are arranged in a staggered manner.

In an exemplary embodiment, the second wiring electrode of the second electrode may include a second vertical wiring electrode, which is disposed along a second side of the unit pixel and extends in parallel to the data line, and second horizontal wiring electrodes, which extend from the second vertical wiring electrode in parallel to the gate line, and the second horizontal wiring electrodes are disposed adjacent to the gate line and are respectively located above and below the gate line.

In an exemplary embodiment, the second main electrodes may extend from the second horizontal wiring electrode and second main electrodes extending upwardly from the second horizontal wiring electrode and second main electrodes extending downwardly from the second horizontal wiring electrode are arranged in a staggered manner.

In an exemplary embodiment, a plurality of first main electrodes and a plurality of second main electrodes may be provided and are alternately arranged and are spaced apart from each other by a predetermined distance so as to include isolation areas therebetween.

In an exemplary embodiment, the first slit electrodes and the second slit electrodes may be alternately arranged, first slit areas, which isolate the first slit electrodes from one another, are disposed among the first slit electrodes, the second slit electrodes are disposed in areas corresponding to the first slit areas, second slit areas, which isolate the second slit electrodes from one another, are disposed among the second slit electrodes, and the first slit electrodes are disposed in areas corresponding to the second slit areas.

In an exemplary embodiment, the length of the first or second main electrodes may vary depending on the size of the unit pixel and be in the range of about 1 micrometer (μm) to about 200 μm.

In an exemplary embodiment, the pitch of the first main electrodes and the second main electrodes may be in the range of about 2 μm to about 20 μm.

In an exemplary embodiment, the line width of the first main electrodes and the second main electrodes may be in the range of about 0.1 μm to about 5 μm.

In an exemplary embodiment, the line width of the first or second slit electrodes may be in the range of 0.1 μm to 5 μm.

In an exemplary embodiment, the pitch of the first slit electrodes and the second slit electrodes may be in the range of about 0.1 μm to about 20 μm.

In an exemplary embodiment, the length of the first slit electrodes and the second slit electrodes may be in the range of about 0.5 μm to about 18 μm.

In an exemplary embodiment, the first slit electrodes and the second slit electrodes may be arranged symmetrically with respect to an imaginary normal line to the first direction in which the first main electrodes or the second main electrodes extend.

In an exemplary embodiment, the first slit electrodes and the second slit electrodes may be alternately arranged with respect to an imaginary normal line to the first direction in which the first main electrodes or the second main electrodes extend.

In an exemplary embodiment, the first slit electrodes and the second slit electrodes may have end portions thereof chamfered.

In an exemplary embodiment, at least one of the first and second polarizing plates may be a wire grid polarizing plate in which metal patterns are arranged.

According to the exemplary embodiments, by arranging slit electrodes of a pixel electrode and slit electrodes of a common electrode in a staggered manner, the formation of disclination lines may be suppressed, and as a result, the transmittance and the response speed of an LCD may be improved.

Other features and exemplary embodiments will be apparent from the following detailed description, the drawings, and the claims.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
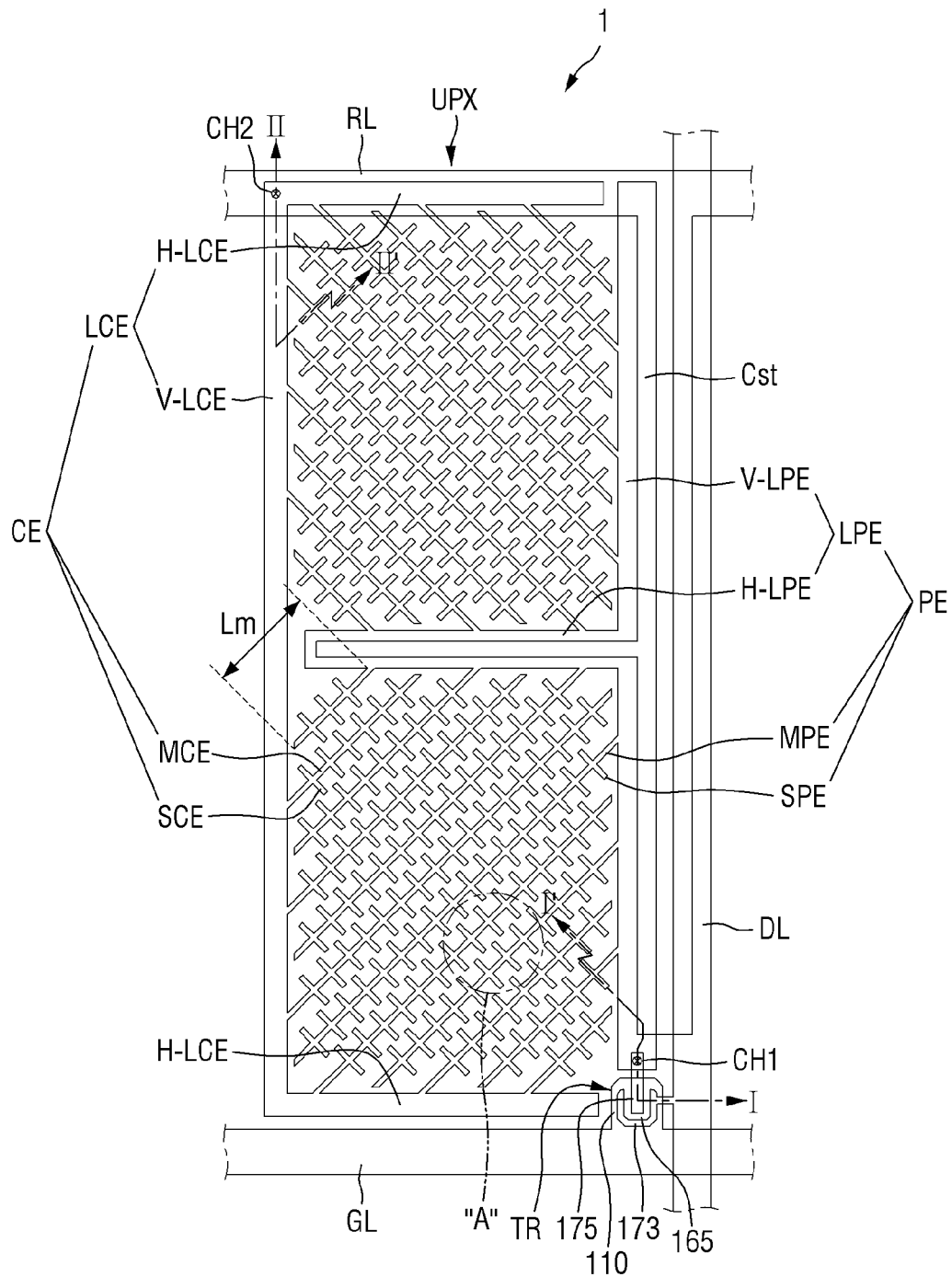
FIG. 1 is a plan view of a liquid crystal display ("LCD") according to an exemplary embodiment of the invention.

Advantages and features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region provided by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments will hereinafter be described with reference to the accompanying drawings.

Figure 2:
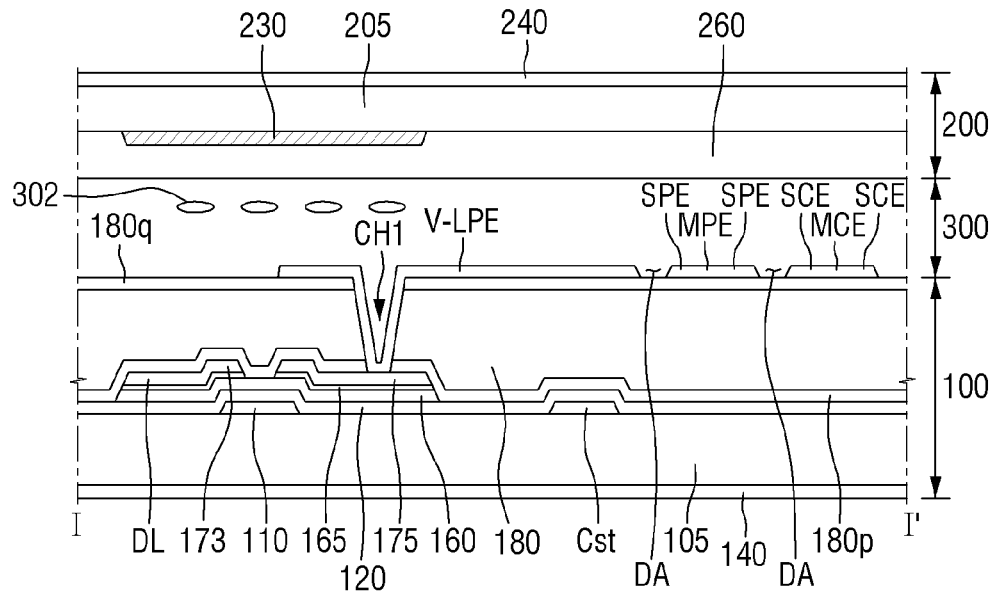
FIG. 2 is a cross-sectional view taken along line I-I' of FIG. 1.
Figure 3:
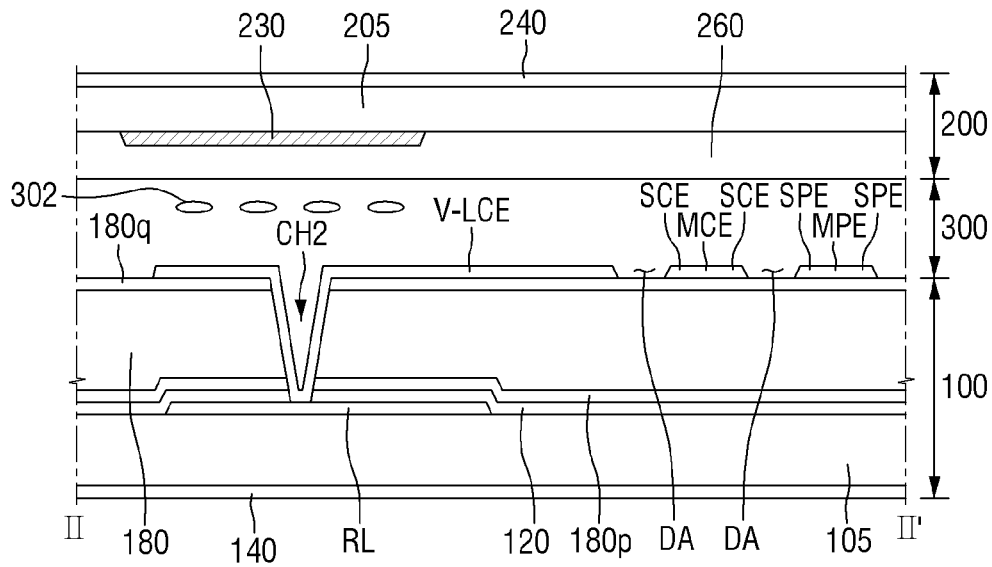
FIG. 3 is a cross-sectional view taken along line II-II' of FIG. 1.
Figure 4:
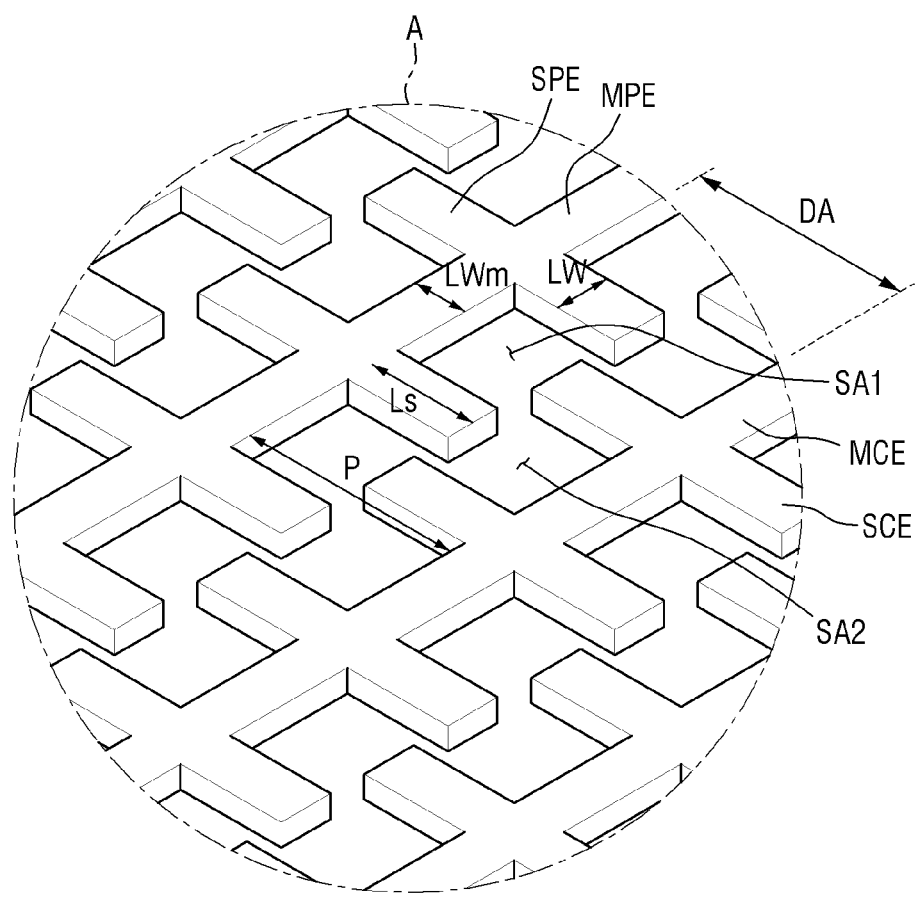
FIG. 4 is an enlarged perspective view of an area "A" of FIG. 1.

FIG. 1 is a plan view of a liquid crystal display ("LCD") according to an exemplary embodiment of the invention, FIG. 2 is a cross-sectional view taken along line I-I' of FIG. 1, FIG. 3 is a cross-sectional view taken along line II-II' of FIG. 1, and FIG. 4 is an enlarged perspective view of an area "A" of FIG. 1.

Referring to FIGS. 1 through 4, an LCD includes a first panel 100 and a second panel 200, which face each other, and a liquid crystal layer 300, which is disposed between the first panel 100 and the second panel 200.

For convenience, a single unit pixel UPX, which corresponds to a single pixel PX (refer to FIG. 9), and its corresponding gate line GL and data line DL are mainly illustrated in the drawings. However, in reality, a plurality of unit pixels UPX, which are arranged in a matrix of rows and columns, may be provided. A plurality of thin-film transistors TR, which are provided in the plurality of unit pixels UPX, respectively, may be disposed at, or near, the intersections between a plurality of gate lines GL, which extend in a row direction, and a plurality of data lines DL, which extend in a column direction.

The first panel 100 may include a first substrate 105, a first electrode and a first alignment film, which are sequentially disposed on a first surface of the first substrate 105, and a first polarizing plate 140, which is disposed on a second surface of the first substrate 105. The first electrode of the first panel 100 may be connected to a TFT TR. In an exemplary embodiment, the first electrode of the first panel 100 may be, for example, a pixel electrode PE.

A second electrode may be disposed on the first panel 100, and particularly, on the same layer as that on which the first electrode, i.e., the pixel electrode PE, is disposed, and may be connected to a sustain electrode line Cst. In an exemplary embodiment, the second electrode may be, for example, a common electrode CE.

The second panel 200 may include a second substrate 205, a color filter, which is disposed on a first surface of the second substrate 205, a light-shielding member 230, an overcoat layer 260, a second alignment film, and a second polarizing plate 240, which is disposed on a second surface of the second substrate 205. In an exemplary embodiment, the second alignment film of the second panel 200 may not be provided. The color filter and the light-shielding member 230 are illustrated as being provided in the second panel 200, but the invention is not limited thereto. That is, in an alternative exemplary embodiment, the color filter and the light-shielding member 230 may be provided in the first panel 100. That is, the first or second panel 100 or 200 may include the TFT TR, the color filter, and the light-shielding member 230.

The first polarizing plate 140 may have a first polarization axis, and the second polarizing plate 240 may have a second polarization axis. The first polarization axis and the second polarization axis may be provided in different directions. More specifically, the first polarization axis and the second polarization axis may cross each other at right angles, for example.

At least one of the first polarizing plate 140 and the second polarizing plate 240 may be provided as a wire grid polarizer in which metal patterns are arranged at regular intervals. In an exemplary embodiment, in response to the wire grid polarizer being provided in the second panel 200, the metal patterns of the wire grid polarizer may perform the functions of a ground electrode for the second panel 200, for example. More specifically, since the first electrode and the second electrode are provided on the first panel 100, no electrodes are provided on the second panel 200. Thus, by providing the wire grid polarizer with the metal patterns in the second panel 200, the formation of static electricity may be prevented. However, the invention is not limited thereto. That is, in an alternative exemplary embodiment, a transparent electrode that may be used as a ground electrode may be provided on the inside or the outside of the second panel 200.

Referring to FIGS. 1 through 4, the unit pixel UPX may be substantially rectangular. The first electrode and the second electrode, which are provided in the unit pixel UPX, may be disposed to cover the unit pixel UPX. The first or second electrode may be patterned to cover part of the unit pixel UPX or cover the entire first or second panel 100 or 200.

The liquid crystal layer 300, which is disposed between the first and second panels 100 and 200, may include liquid crystal molecules 302 with negative dielectric anisotropy or positive dielectric anisotropy. In the description that follows, it is assumed that the liquid crystal layer 300 includes liquid crystal molecules 302 with positive dielectric anisotropy. In the absence of an electric field between the pixel electrode PE and the common electrode CE, the liquid crystal molecules 302 of the liquid crystal layer 300 may be aligned with their long axes parallel to the surfaces of the first and second alignment films (not shown) and/or the first and second panels 100 and 200.

The first and second panels 100 and 200 will hereinafter be described in further detail.

The first panel 100 includes the first substrate 105, a gate line GL, the sustain electrode line Cst, a data line DL, the pixel electrode PE, and the common electrode CE. The pixel electrode PE and the common electrode CE may be disposed on the same layer.

In an exemplary embodiment, the first substrate 105 may include soda lime glass, borosilicate glass, or a plastic material with optical anisotropy, for example.

The unit pixel UPX, which is arranged in a matrix form with other unit pixels UPX, may be defined on the first substrate 105. More specifically, the unit pixel UPX may be defined as an area provided by the gate line GL and the data line DL intersecting each other. Accordingly, the unit pixel UPX may be regularly arranged in various forms, such as a matrix form, a mosaic form, and the like.

The gate line GL may extend between the unit pixel UPX and a neighboring unit pixel UPX over the first substrate 105. The gate line GL may include a gate electrode 110, which extends toward the unit pixel UPX.

The data line DL may be disposed on the first substrate 105 where the gate line GL is disposed, and may be insulated from the gate line GL. The data line DL may extend between the unit pixel UPX and a neighboring unit pixel UPX while intersecting the gate line GL.

A TFT TR may be provided in the unit pixel UPX, which is defined by the data line Dl and the gate line GL intersecting each other. More specifically, the TFT TR may be provided in an overlapping area of the gate electrode 110, which extends from the gate line GL, and the source and drain electrodes 173 and 175, which extend from the data line DL.

The TFT TR may be electrically connected to the gate line GL and the data line DL. The TFT TR may be disposed along the gate line GL or the data line DL, and may be electrically connected to the gate line GL and the data line DL. Accordingly, the TFT TR may output a pixel voltage applied thereto from the data line DL according to a control signal applied thereto from the gate line GL.

The pixel voltage may be applied to the first electrode, i.e., the pixel electrode PE. The common electrode CE may be disposed on the same layer as that on which the pixel electrode PE is disposed. By providing the pixel electrode PE and the common electrode on the same layer, a horizontal field may be generated, and as a result, the liquid crystal molecules 302 in the liquid crystal layer 300 may be rotated.

The structure of the LCD will hereinafter be described in further detail, focusing more on the TFT TR.

The gate line GL may be disposed on the first substrate 105 along a first direction. The TFT TR may be disposed in an area in which the gate electrode 110, which extends from the gate line GL, is provided.

To reduce delays in a control signal applied to the gate line GL, the gate line GL may include a metal with low resistance to have a large cross-sectional area.

However, when the line width of the gate line GL taken along the column direction in a plan view is too large, the transmittance ratio of the unit pixel UPX may decrease.

Also, when the gate line GL is too thick in a cross-sectional direction, it may become difficult to properly form layers over the gate line GL. Accordingly, the gate line GL may be provided to have a suitable thickness and line width for preventing a decrease in the transmittance ratio of the unit pixel UPX and at the same time, facilitating the formation of layers over the gate line GL.

Referring to FIGS. 1 and 4, the sustain electrode line Cst and a reference voltage line RL may be disposed on the same layer as that on which the gate line GL is disposed, but the invention is not limited thereto.

The reference voltage line RL may be spaced apart from the gate line GL by a predetermined distance and may extend in parallel to the gate line GL, but the invention is not limited thereto. In an alternative exemplary embodiment, the reference voltage line RL may be disposed on the same layer as that on which the data line DL is disposed, and may extend in parallel to the data line DL. The sustain electrode line Cst may also be disposed on the same layer as that on which the data line DL is disposed.

The sustain electrode line Cst may be connected to the reference voltage line RL. As illustrated in FIG. 1, the sustain electrode line Cst may be branched off from the reference voltage line RL and may be disposed along a side of the unit pixel UPX. More specifically, the edge of the unit pixel UPX may partially overlap the data line DL or the pixel electrode PE. That is, the sustain electrode line Cst may partially overlap the electrodes disposed thereon so as to form sustain capacitance.

The reference voltage line RL may partially overlap the common electrode CE, and the common electrode CE and the reference voltage line RL may be connected to each other via a second contact hole CH2 and may thus apply a common voltage to the common electrode CE. More specifically, the reference voltage line RL may be connected to part of at least one second horizontal wiring electrode H-LCE of the common electrode CE via the second contact hole CH2. Accordingly, the same voltage may be applied to the reference voltage line RL, the sustain electrode line Cst, and the common electrode CE.

More specifically, the at least one second horizontal wiring electrode H-LCE of the common electrode CE may be disposed to overlap the reference voltage line RL. The reference voltage line RL and the at least one second horizontal wiring electrode H-LCE may be connected to each other via the second contact hole CH2.

The reference voltage line RL and the sustain electrode line Cst may be connected to each other. The sustain electrode line Cst may be arranged in a direction parallel to the data line DL and may partially overlap the data line DL and a first vertical wiring electrode V-LPE of the pixel electrode PE. As the overlapping area of electrodes having different voltages increases, the sustain capacitance increases. Accordingly, the sustain electrode line Cst may be disposed to at least partially overlap the first vertical wiring electrode V-LPE or the first horizontal wiring electrode H-LPE to form sustain capacitance.

The gate line GL, the sustain electrode line Cst, and the reference voltage line RL may be disposed on the same layer using the same material. In an exemplary embodiment, the gate line GL, the sustain electrode line Cst, and the reference voltage line RL may include an aluminum (Al)-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), titanium (Ti), tantalum (Ta), or the like.

In an exemplary embodiment, the gate line GL, the sustain electrode line Cst, and the reference voltage line RL may have a multilayer structure including two conductive films (not illustrated) having different physical properties, where one of the two conductive films may include a low-resistivity metal, for example, an Al-based metal, an Ag-based metal, or a Cu-based metal, so as to reduce any signal delays or voltage drops in the gate line GL, the sustain electrode line Cst, and the reference voltage line RL.

Referring back to FIGS. 1 and 2, a gate insulating layer 120 may be disposed on an entire surface of the first substrate 105 where the gate line GL, the sustain electrode line Cst, and the reference voltage line RL are provided. In an exemplary embodiment, the gate insulating layer 120 may include silicon oxide (SiOx) or silicon nitride (SiNx), for example.

A semiconductor layer 160 may be disposed on the gate insulating layer 120. The semiconductor layer 160 may be disposed to at least partially overlap the gate electrode 110. In an exemplary embodiment, the semiconductor layer 160 may include an oxide semiconductor including amorphous silicon (a-Si), polysilicon, zinc oxide (ZnO), or the like, for example.

An ohmic contact layer 165 may be disposed on the semiconductor layer 160.

A data conductor including the data line DL, which has the source electrode 173 and the drain electrode 175 that is spaced apart from the source electrode 173 by a predetermined distance, may be disposed on the ohmic contact layer 165 and the gate insulating layer 120.

The data conductor, which is disposed on the semiconductor layer 160, may include the data line DL, which extends in a vertical direction to intersect the gate line GL. The data conductor and the semiconductor layer 160 and the ohmic contact layer 165, which are provided below the data conductor, may be provided at the same time using a single mask.

The data line DL may transmit a data signal and may extend substantially in the vertical direction to intersect the gate line GL. The data line DL may include the source electrode 173, which extends toward, and overlaps the gate electrode GE. The data line DL may also include the drain electrode 175, which faces, and is spaced from, the source electrode 173 connected to the data line DL. One end of the drain electrode 175 is surrounded by the source electrode 173, which is U-shaped, for example. The other end of the drain electrode 175 may partially overlap, and may be connected via a first contact hole CH1 to the pixel electrode PE. More specifically, the other end of the drain electrode 175 may be connected to the first vertical wiring electrode V-LPE of the pixel electrode PE via the first contact hole CH1.

The semiconductor layer 160 may have substantially the same planar shape as that of the data conductor and the ohmic contact 165 provided therebelow, except for a channel region between the source electrode 173 and the drain electrode 175. That is, the semiconductor layer 160 has parts that are exposed by not being covered by the data conductor, such as the part between the source electrode 173 and the drain electrode 175.

The data line DL may directly contact the semiconductor layer 160 and may thus form the ohmic contact 165. The data line DL may be provided as a single layer including a low-resistance material so as to perform the functions of an ohmic contact with respect to the semiconductor layer 160. In an exemplary embodiment, the data line DL may include Cu, Al or Ag, for example.

In an exemplary embodiment, to improve the ohmic contact properties of the data line DL with respect to the semiconductor layer 160, the data line DL may have a single- or multilayer structure including Ni, Co, Ti, Ag, Cu, Mo, Al, beryllium (Be), niobium (Nb), gold (Au), iron (Fe), selenium (Se), or Ta, for example. As examples of the multilayer structure, a double layer structure may include Ta/Al, Ta/Al, Ni/Al, Co/Al, Mo (or a Mo alloy)/Cu, Mo (or a Mo alloy)/Cu, Ti (or a Ti alloy)/Cu, TiN (or a TiN alloy)/Cu, Ta (or a Ta alloy)/Cu, or TiOx/Cu, and a triple layer structure may include Ti/Al/Ti, Ta/Al/Ta, Ti/Al/TiN, Ta/Al/TaN, Ni/Al/Ni, or Co/Al/Co, for example.

The gate electrode 110, the source electrode 173, and the drain electrode 175 may form the TFT TR together with the semiconductor layer 160, and at least one TFT TR may be disposed in the unit pixel UPX. The channel of the TFT TR may be defined in the semiconductor layer 160 between the source electrode 173 and the drain electrode 175. Since the LCD has a "one pixel" structure in which one TFT TR is provided in each unit pixel UPX, the aperture ratio and transmittance of the LCD may both be improved.

A passivation layer may be disposed on the data conductor and exposed parts of the semiconductor layer 160. The passivation layer may be provided as an inorganic layer or an organic layer. In an alternative exemplary embodiment, to protect the semiconductor layer 160, the passivation layer may be provided as a double layer including a lower inorganic layer and an upper organic layer. In an alternative exemplary embodiment, the passivation layer may be provided as a triple layer including a lower inorganic layer 180p, an organic layer 180, which is disposed on the lower inorganic layer 180p, and an upper inorganic layer 180q, which is disposed on the organic layer 180. A color filter may be used as the organic layer 180 used in the passivation layer. In an alternative exemplary embodiment, to address the problems with parasitic capacitance and provide a planar surface on the color filter, an additional organic layer may be provided on the color filter.

In an exemplary embodiment the lower inorganic layer 180p may be disposed below the data conductor and the exposed parts of the semiconductor layer 160 and may include an inorganic insulating material such as silicon nitride or silicon oxide, for example. The lower inorganic layer 180p will hereinafter be referred to as the lower passivation layer 180p, and the upper inorganic layer 180q will hereinafter be referred to as the upper passivation layer 180q.

The organic layer 180, which is provided on the lower passivation layer 180p, may also be used as a passivation layer, in which case, the color filter may be used as the organic layer 180. In an alternative exemplary embodiment, the color filter may be provided, and a transparent organic layer may be additionally provided on the color filter as the organic layer 180. That is, the transparent organic layer additionally provided on the color filter may be optional.

In an exemplary embodiment, the color filter may extend in the vertical direction along the data line DL, and may display, for example, one of three primary colors, i.e., red, green, and blue. The color filter may be disposed above the data line DL to overlap the data line DL. An organic layer for planarization may be additionally provided on the color filter.

The upper passivation layer 180q may be disposed on the color filter and parts of the lower passivation layer 180p exposed through openings. The upper passivation layer 180q may prevent the color filter from being lifted off from the underlying layers and may also prevent the liquid crystal layer 300 from being contaminated by an organic material such as a solvent from the color filter, thereby preventing defects such as image sticking that may occur during the driving of the LCD. In an exemplary embodiment, the upper passivation layer 180q may include an inorganic insulating material such as silicon nitride or silicon oxide, or an organic material.

The first contact hole CH1, which connects the end of the drain electrode 175 and the end of the pixel electrode PE, may be defined through the lower passivation layer 180p, the organic layer 180 (e.g., color filter), and the upper passivation layer 180q.

The pixel electrode PE and the common electrode CE may be disposed on the upper passivation layer 180q. In an exemplary embodiment, the pixel electrode PE and the common electrode CE may include a transparent conductive material such as indium tin oxide ("ITO"), indium gallium zinc oxide ("IGZO"), indium zinc oxide ("IZO"), or the like.

The pixel electrode PE may be provided in the unit pixel UPX, which is defined by the gate line GL and the data line DL. The pixel electrode PE may receive a data voltage via the TFT TR, which is controlled by a gate signal. In other words, the pixel electrode PE, which is arranged as illustrated in FIG. 1, may be connected to the drain electrode 175 via the first contact hole CH1 and may receive a data voltage from the drain electrode 175.

The common electrode CE may be provided in the unit pixel UPX, which is defined by the gate line GL and the data line DL. The common electrode CE may be connected to the reference voltage line RL or the sustain electrode line Cst via the second contact hole CH2. Accordingly, the common electrode CE may receive the common voltage provided thereto from the reference voltage line RL via the second contact hole CH2. The pixel voltage applied to the pixel electrode PE and the common voltage applied to the common electrode CE may differ from each other.

The pixel electrode PE, which receives the pixel voltage via the drain electrode 175, and the common electrode CE, which receives the common voltage via the reference voltage line RL, may be disposed on the same layer of the unit pixel UPX in a staggered manner.

Accordingly, the common electrode CE and the pixel electrode PE may be provided with different voltages and may thus form a horizontal field therebetween, and the horizontal field may rotate the liquid crystal molecules 302 in the liquid crystal layer 300, which is disposed between the first and second panels 100 and 200.

The arrangement of the pixel electrode PE and the common electrode CE will hereinafter be described in further detail with reference to FIGS. 1 and 4. Referring to FIGS. 1 and 4, the pixel electrode PE may include a first wiring electrode LPE, which is disposed in the unit pixel UPX, first main electrodes MPE, which are branched off from the first wiring electrode LPE, and first slit electrodes SPE, which are branched off from the first main electrodes MPE and are arranged in a normal direction to the first main electrodes MPE. First slit areas SA1, which isolate the first slit electrodes SPE from one another, may be defined among the first slit electrodes SPE.

The common electrode CE may include a second wiring electrode LCE, which is disposed in the unit pixel UPX, second main electrodes MCE, which are branched off from the first wiring electrode LCE, and second slit electrodes SCE, which are branched off from the second main electrodes MCE and are arranged in a normal direction to the second main electrodes MCE. Second slit areas SA2, which isolate the second slit electrodes SCE from one another, may be defined among the second slit electrodes SCE.

The first main electrodes MPE of the pixel electrode PE and the second main electrodes MCE of the common electrode CE may be spaced apart from each other by a predetermined distance and may be arranged in a staggered manner. In isolation areas DA between the first is main electrodes MPE of the pixel electrode PE and the second main electrodes MCE of the common electrode CE, the first slit electrodes SPE and the second slit electrodes SCE may be provided. The first slit electrodes SPE and the second slit electrodes SCE may be alternately arranged.

The structure and the arrangement of the pixel electrode PE will hereinafter be described first. The first wiring electrode LPE of the pixel electrode PE may include the first vertical wiring electrode V-LPE, which is disposed along one side of the unit pixel UPX and extends in parallel to the data line DL, and the first horizontal wiring electrode H-LPE, which is branched off from the first vertical wiring electrode V-LPE and extends in parallel to the gate line GL.

In an exemplary embodiment, the first horizontal wiring electrode H-LPE may be arranged in a perpendicular direction to a lengthwise direction of the first vertical wiring electrode V-LPE, for example. In an exemplary embodiment, the first horizontal wiring electrode H-LPE may be branched off from a particular point on the length of the first vertical wiring electrode V-LPE, for example, a point corresponding to one half the length of the first vertical wiring electrode V-LPE, and may thus divide the unit pixel UPX into two regions. An upper part of the unit pixel UPX defined by the first horizontal wiring electrode H-LPE will hereinafter be referred to as an upper region, and a lower part of the unit pixel UPX defined by the first horizontal wiring electrode H-LPE will hereinafter be referred to as a lower region.

The pixel electrode PE may include the first main electrodes MPE, which are disposed in both the upper and lower regions. In the upper region of the unit pixel UPX, the first main electrodes MPE may be branched off from the first vertical wiring electrode V-LPE and the first horizontal wiring electrode H-LPE to be arranged in a direction of about 135° with respect to the first vertical wiring electrode V-LPE and the first horizontal wiring electrode H-LPE, for example. In the lower region of the unit pixel UPX, the first main electrodes MPE may be branched off from the first vertical wiring electrode V-LPE and the first horizontal wiring electrode H-LPE to be arranged in a direction of about 225° with respect to the first vertical wiring electrode V-LPE and the first horizontal wiring electrode H-LPE, for example.

However, the angle at which the first main electrodes MPE are arranged with respect to the first vertical wiring electrode V-LPE and the first horizontal wiring electrode H-LPE is not limited to about 135° or about 225°. That is, the first main electrodes MPE may be arranged at an angle of about 130° to about 140° or about 220° to about 230°, for example. By arranging the first main electrodes MPE to have different lengthwise directions in the same unit pixel UPX, a plurality of domains may be defined. As a result, the LCD may realize a wide viewing angle.

The pixel electrode PE may include the first slit electrodes SPE, which are branched off from the first main electrodes MPE. The first slit electrodes SPE may be arranged in a normal direction to the lengthwise direction of the first main electrodes MPE. The first slit electrodes SPE may be disposed in the isolation areas DA.

The first slit electrodes SPE may be branched off from both sides of the first main electrodes MPE with respect to the lengthwise direction of the first main electrodes MPE. First slit electrodes SPE branched off from one side of each of the first main electrodes MPE may be respectively aligned with first slit electrodes SPE branched off from the other side of each of the first main electrodes MPE with respect to the lengthwise direction of the first main electrodes MPE.

The first slit electrodes SPE may be isolated from one another, and the gaps thereamong may be defined as the first slit areas SA1. The second slit electrodes SCE of the common electrode CE may be disposed to correspond to the first slit areas SA1. Accordingly, the first slit electrodes SPE of the pixel electrode PE and the second slit electrodes SCE of the common electrode CE may be alternately arranged.

The common electrode CE may be arranged in a similar manner to the pixel electrode PE, and thus will hereinafter be described, focusing mainly on differences with the pixel electrode PE. The common electrode CE may include the second wiring electrode LCE, the second main electrodes MCE, and the second slit electrodes SCE.

The second wiring electrode LCE of the common electrode CE may include a second vertical wiring electrode V-LCE, which is arranged in a direction parallel to the first vertical wiring electrode V-LPE, and second horizontal wiring electrodes H-LCE, which are branched off from the second vertical wiring electrode V-LCE and are arranged in a direction parallel to the first horizontal wiring electrode H-LPE.

The second vertical wiring electrode V-LCE may be disposed in the unit pixel UPX on the opposite side of the first vertical wiring electrode V-LPE and may extend in parallel to the data line DL.

The second horizontal wiring electrodes H-LCE may be branched from both ends of the second vertical wiring electrode V-LCE and may be respectively disposed at the top of the upper region and the bottom of the lower region. One of the second horizontal wiring electrodes H-LCE may be disposed to at least partially overlap the reference voltage line RL.

A portion of the second vertical wiring electrode V-LCE adjacent to the first horizontal wiring electrode H-LPE may be in a chevron shape with the apex facing the first horizontal wiring electrode H-LPE.

The common electrode CE may also include the second main electrodes MCE, which are branched off from the second wiring electrode LCE. The second main electrodes MCE may be arranged in a direction parallel to the lengthwise direction of the first main electrodes MPE. The second main electrodes MCE may be arranged in a direction of about 315° with respect to the second vertical wiring electrode V-LCE and the second horizontal wiring electrode H-LCE in the upper region to be arranged in parallel to the first main electrodes MPE, for example, but the invention is not limited thereto. That is, in the upper region, the second main electrodes MCE may be arranged at an angle of about 310° to about 320°, for example.

The second main electrodes MCE may be arranged in a direction of 45° with respect to the second vertical wiring electrode V-LCE and the second horizontal wiring electrode H-LCE in the lower region, but the invention is not limited thereto. That is, in the lower region, the second main electrodes MCE may be arranged at an angle of about 40° to about 50°, for example.

The first main electrodes MPE and the second electrodes MCE, which are disposed in parallel to the first main electrodes MPE, may be alternately arranged. In other words, the second main electrodes MCE may be disposed among the first main electrodes MPE. The second main electrodes MCE and the first main electrodes MPE may be isolated from each other. The isolation areas DA may be defined in the gaps between the second main electrodes MCE and the first main electrodes MPE.

In an exemplary embodiment, the first main electrodes MPE and the second main electrodes MCE, which are alternately arranged with the first main electrodes MPE, may be arranged at a pitch P (refer to FIG. 4) of about 2 μm to about 20 μm, for example. The larger the pitch of the first main electrodes MPE and the second main electrodes MCE is, the higher the transmittance of the LCD becomes, but the lower the response speed of the LCD becomes. Thus, the pitch of the first main electrodes MPE and the second main electrodes MCE may be determined in consideration of the response speed and the transmittance of the LCD to be in the range of about 2 μm to about 20 μm, for example. By adjusting the pitch of the first main electrodes MPE and the second main electrodes MCE, a pixel having a "high" region and a "low" region may be realized.

In an exemplary embodiment, the line width LWm (refer to FIG. 4) of the first main electrodes MPE and the second main electrodes MCE may be in the range of about 0.1 μm to about 5 μm, for example. In an exemplary embodiment, the length Lm (refer to FIG. 1) of the first main electrodes MPE and the second main electrodes MCE may be in the range of about 1 μm to about 200 μm depending on the size of the unit pixel UPX, for example.

The common electrode CE may also include the second slit electrodes SCE, which are arranged in a parallel direction to the lengthwise direction of the second main electrodes MCE. The second slit electrodes SCE, like the first slit electrodes SPE, may be disposed in the isolation areas DA.

The second slit electrodes SCE may be disposed among the first slit electrodes SPE. More specifically, the first slit areas SA1, which isolate the first slit electrodes SPE from one another, may be disposed among the first slit electrodes SPE, and the second slit electrodes SCE may be disposed to correspond to the first slit areas SA1.

The second slit areas SA2, which isolate the second slit electrodes SCE from one another, may be disposed among the second slit electrodes SCE, and the first slit electrodes SPE may be disposed to correspond to the second slit areas SA2. That is, the first slit electrodes SPE and the second slit electrodes SCE may be alternately arranged.

The first or second slit electrodes SPE or SCE may, or may not, be disposed in the first or second slit areas SA1 or SA2. In an exemplary embodiment, the ends of the first slit electrodes SPE and the ends of the second slit electrodes SCE may be disposed on the same imaginary line, for example.

The first or second slit electrodes SPE or SCE may be arranged in the normal direction to the lengthwise direction of the first or second main electrodes MPE or MCE, respectively. Accordingly, first or second slit electrodes SPE or SCE branched off from one side of each of the first or second main electrodes MPE or MCE may be respectively aligned with first or second slit electrodes SPE or SCE branched off from the other side of each of the first or second main electrodes MPE or MCE, but the invention is not limited thereto. That is, in an alternative exemplary embodiment, the first or second slit electrodes SPE or SCE branched off from one side of each of the first or second main electrodes MPE or MCE and the first or second slit electrodes SPE or SCE branched off from the other side of each of the first or second main electrodes MPE or MCE may be arranged in a staggered manner.

In an exemplary embodiment, the first slit electrodes SPE and the second slit electrodes SCE, which are alternately arranged with the first slit electrodes SPE, may be arranged at a pitch of about 0.1 µm to about 20 µm, for example, but the invention is not limited thereto. More specifically, the larger the pitch of the first slit electrodes SPE and the second slit electrodes SCE is, the lower the response speed of the LCD becomes. The smaller the pitch of the first slit electrodes SPE and the second slit electrodes SCE is, the more difficult it becomes to fabricate the first slit electrodes SPE and the second slit electrodes SCE through exposure. Thus, the pitch of the first slit electrodes SPE and the second slit electrodes SCE may be determined in consideration of the response speed and manufacturing processes of the LCD to be in the range of about 1 µm to about 10 µm, for example.

In an exemplary embodiment, the line width LWs (refer to FIG. 4) of the first slit electrodes SPE and the second slit electrodes SCE may be in the range of about 0.1 µm to about 5 µm, for example, but the invention is not limited thereto. More specifically, the smaller the line width of the first slit electrodes SPE and the second slit electrodes SCE is, the higher the transmittance of the LCD becomes. However, when the line width of the first slit electrodes SPE and the second slit electrodes SCE is too small, the resistance of wiring may increase, defects such as short circuits may occur, and the manufacturing cost of the LCD may increase. Thus, the line width of the first slit electrodes SPE and the second slit electrodes SCE may be determined in consideration of the resistance of wiring and the risk of short circuits to be in the range of about 0.5 µm to about 3 µm, for example.

In an exemplary embodiment, the length Ls (refer to FIG. 4) of the first slit electrodes SPE and the second slit electrodes SCE may be in the range of about 0.5 µm to about 18 µm, for example, but the invention is not limited thereto. More specifically, the greater the length of the first slit electrodes SPE and the second slit electrodes SCE is, the lower the transmittance of the LCD becomes. The smaller the length of the first slit electrodes SPE and the second slit electrodes SCE is, the higher the risk of bruising becomes due to the formation of disclinations in the form of lines. Thus, the length of the first slit electrodes SPE and the second slit electrodes SCE may be determined in consideration of the transmittance and the response speed of the LCD and the risk of bruising to be in the range of about 1 µm to about 9 µm, for example.

Since the pixel electrode PE and the common electrode CE are disposed on the same layer so as to form a horizontal field therebetween, the LCD may realize a wide viewing angle. Also, since the first slit electrodes SPE and the second slit electrodes SCE are arranged in a staggered manner, the formation of disclination lines may be controlled, and as a result, the response speed of the LCD may be improved.

Figure 5:
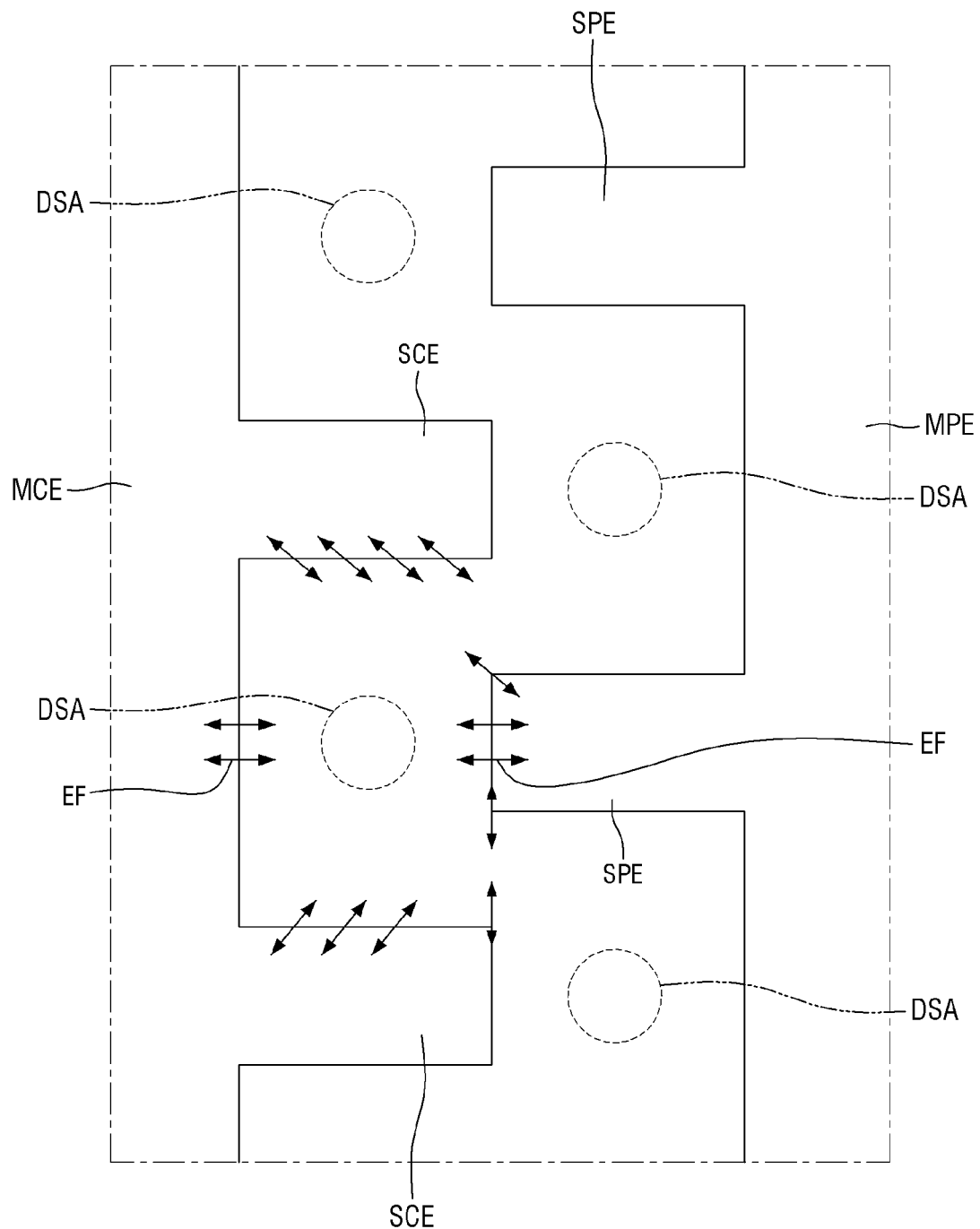
FIG. 5 is a plan view illustrating the liquid crystal behavior of the LCD of FIG. 1.

FIG. 5 is a plan view illustrating the liquid crystal behavior of the LCD of FIG. 1. For convenience, the liquid crystal behavior of the LCD will hereinafter be described with reference to FIG. 5 and with further reference to FIGS. 1 through 4, avoiding any redundant description of the LCD of FIGS. 1 through 5.

Referring to FIG. 5, the first and second electrodes may be disposed on the same plane in the unit pixel UPX of the LCD. The first electrode may be the pixel electrode PE, and the second electrode may be the common electrode CE.

The pixel electrode PE and the common electrode CE may be provided with different voltages and may thus generate a potential difference therebetween. As a result, a horizontal field may be generated between the pixel electrode PE and the common electrode CE.

The pixel electrode PE includes first main electrodes MPE and first slit electrodes SPE, and the common electrode CE includes second main electrodes MCE and second slit electrodes SCE. The first main electrodes MPE and the second main electrodes MCE are alternately arranged, and the first slit electrodes SPE and the second slit electrodes SCE are alternately arranged. Since the first main electrodes MPE and the second main electrodes MCE are arranged in a staggered manner and the first slit electrodes SPE and the second slit electrodes SCE are arranged in a staggered manner, the liquid crystal molecules 302 may be controlled in various directions, and thus, the viewing angle of the LCD may be further improved.

Accordingly, a horizontal field EF may be generated between the first slit electrodes SPE and the second slit electrodes SCE and between the first or second slit electrodes SPE or SCE and the first or second main electrodes MPE or MCE. As a result, the liquid crystal molecules 302, which have positive dielectric anisotropy, may be aligned with their long axes parallel to a direction in which the horizontal field is generated.

The horizontal field EF may be generated between the first slit electrodes SPE and the second slit electrodes SCE, and may also be generated between the first or second slit electrodes SPE or SCE and the first or second main electrodes MPE or MCE. Accordingly, disclinations, which account for changes in the alignment of the liquid crystal molecules 302, may be provided between the ends of the first or second slit electrodes SPE or SCE and the first or second main electrodes MPE or MCE.

Disclinations, however, may lower the transmittance and the response speed of the LCD. More specifically, disclinations may appear in the form of lines in a conventional LCD and may thus lower the transmittance of the conventional LCD. In the exemplary embodiment, disclinations DSA may be provided in first slit areas SA1 and second slit areas SA2 in the form of dots.

Accordingly, since the disclinations DSA, which are dot-shaped, are provided in the first slit areas SA1 and the second slit areas SA2, the control of disclinations may be facilitated, and as a result, the transmittance and the response speed of the LCD may be improved.

Figure 6:
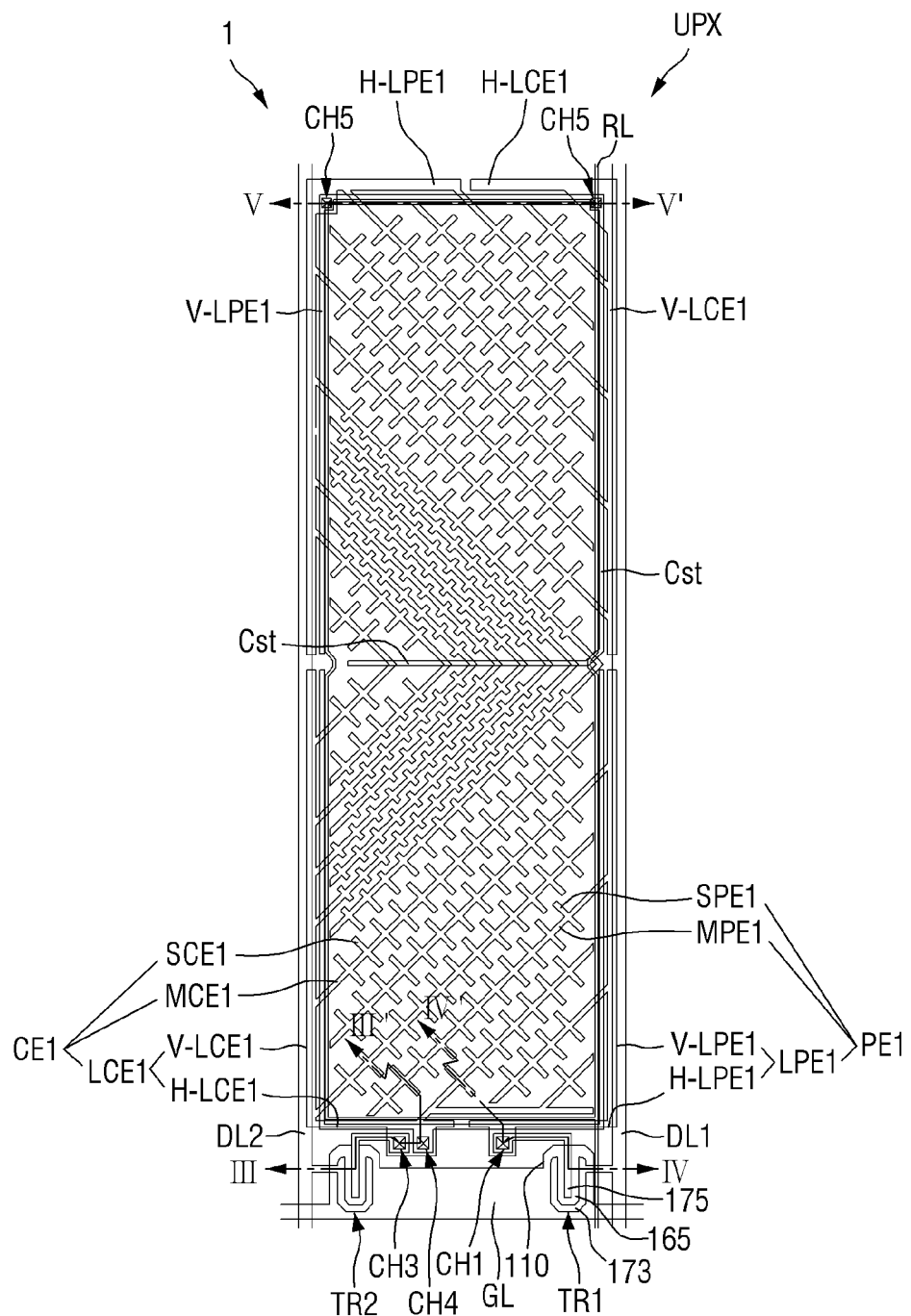
FIG. 6 is a plan view of an LCD according to another exemplary embodiment of the invention.
Figure 7:
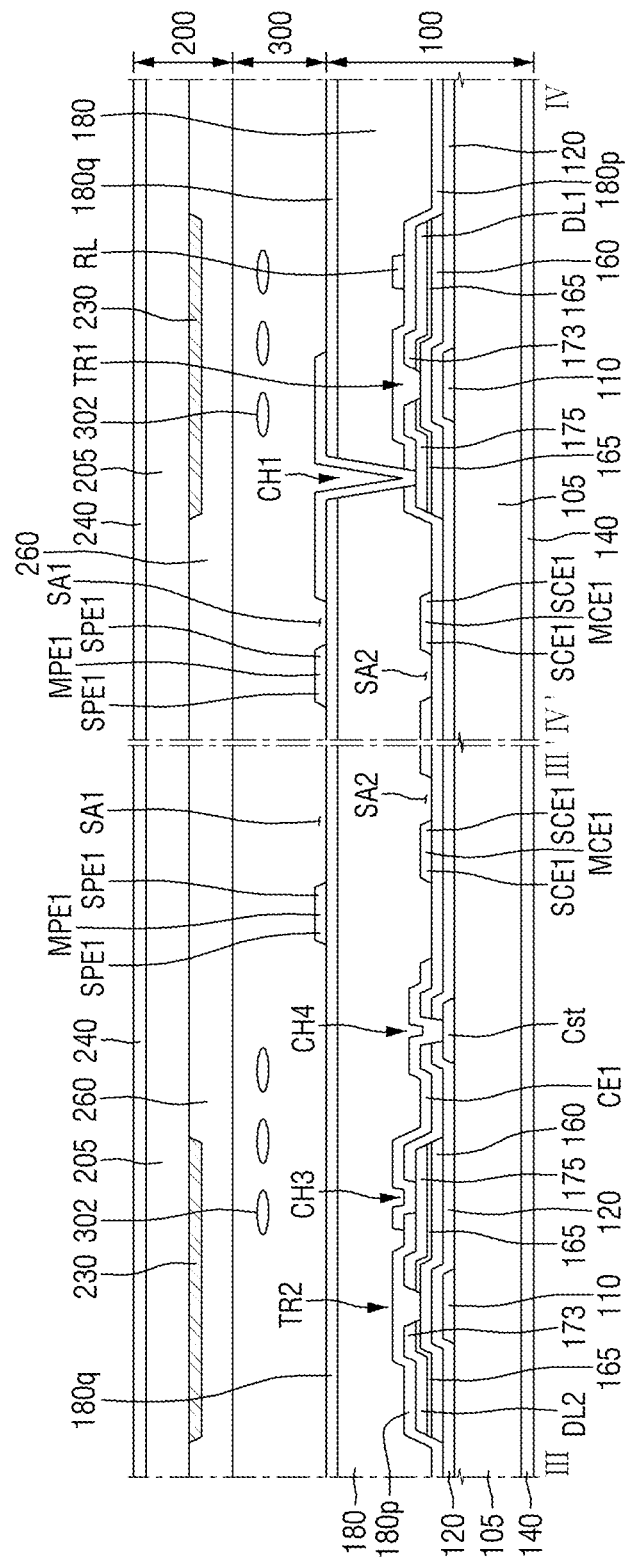
FIG. 7 is a cross-sectional view taken along lines and IV-IV' of FIG. 6.
Figure 8:
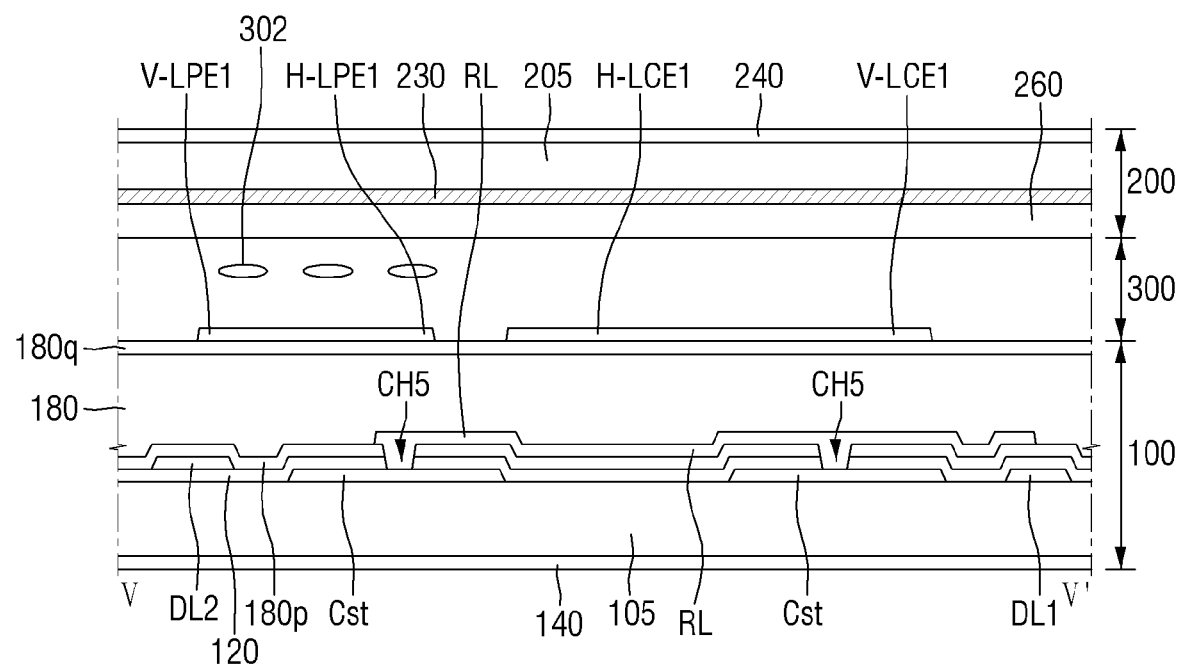
FIG. 8 is a cross-sectional view taken along line V-V' of FIG. 6.

FIG. 6 is a plan view of an LCD according to another exemplary embodiment of the invention, FIG. 7 is a cross-sectional view taken along lines and IV-IV' of FIG. 6, and FIG. 8 is a cross-sectional view taken along line V-V' of FIG. 6.

For convenience, an LCD according to another exemplary embodiment of the invention will hereinafter be described with reference to FIGS. 6 through 8 and with further reference to FIGS. 1 through 5, avoiding any redundant description of the LCD of FIGS. 1 through 5.

Referring to FIGS. 6 through 8, a first TFT TR1 may be disposed at the intersection between a gate line GL and a data line DL1, and a second TFT TR2 may be disposed at the intersection between the gate line GL and a signal line DL2.

The gate line GL may be disposed on a first substrate 105, and a sustain electrode line Cst, which is disposed on the same layer as that on which the gate line GL is disposed, may be disposed along the sides of a unit pixel UPX. A gate insulating layer 120 may be disposed on the layer where the sustain electrode line Cst and the gate line GL are provided.

Semiconductor layers 160 and ohmic contacts 165 may be disposed on the gate insulating layer 120. The semiconductor layers 160 and the ohmic contacts 165 may be disposed to overlap gate electrodes 110, which extend from the gate line GL.

The data line DL1 may be disposed on the ohmic contacts 165. Source electrodes 163 and drain electrodes 165 may be connected to the data line DL1. The signal line DL2 may be arranged in a direction parallel to the data line DL1. The signal line DL2 may be disposed on the same layer as that on which the data line DL1 is disposed, and may be provided by the same process used to form the data line DL1. Accordingly, the signal line DL2, like the data line DL1, may have a semiconductor layer 160 and an ohmic contact layer 165 defined therebelow.

A voltage applied from the data line DL1 to a first electrode and a voltage applied from the data line DL2 to a second electrode may differ from each other. The first electrode will hereinafter be referred to as a pixel electrode PE1, and the second electrode will hereinafter be referred to as a common electrode CE1.

A horizontal field may be generated between the pixel electrode PE1 and the common electrode CE1, which are provided with different voltages, due to a potential difference between the pixel electrode PE1 and the common electrode CE1. The horizontal field may rotate liquid crystal molecules 302 in a liquid crystal layer 300, which is disposed between a first panel 100 and a second panel 200.

A lower passivation layer 180p may be disposed on the first substrate 105 where the data line DL1 and the signal line DL2 are provided. A reference voltage line RL may be provided on the lower passivation layer 180p, and may be disposed along a side of the unit pixel UPX. The reference voltage line RL may be arranged in a direction parallel to the data line DL1 or the signal line DL2 to receive the same voltage.

The second TFT TR2, which is connected to the signal line DL2, may have a similar shape to that of the first TFT TR1 and thus will hereinafter be described with reference to the shape of the first TFT TR1. A third contact hole CH3 and a fourth contact hole CH4 may be defined in the end of a drain electrode 175 of the second TFT TR2, which is connected to the is signal line DL2. The third contact hole CH3 may connect the common electrode CE1 and the drain electrode 175 of the second TFT TR2, and the fourth contact hole CH4 may connect the sustain electrode line Cst and the drain electrode 175 of the second TFT TR2.

The reference voltage line RL may be disposed to partially overlap the sustain electrode line Cst and may be connected to the sustain electrode line Cst via fifth contact holes CH5. The reference voltage line RL, which is connected to the sustain electrode line Cst, may be connected to the common electrode CE1 via the fifth contact holes CH5. More specifically, the reference voltage line RL may be connected to a "2-1" wiring electrode LCE1 via the fifth contact holes CH5, and particularly, to an area in which a "2-1" vertical wiring electrode V-LCE-1 and a "2-1" horizontal wiring electrode H-LCE1 are connected.

Accordingly, a voltage provided by the signal line DL2 may be provided to the common electrode Ce, the sustain electrode line Cst, and the reference voltage line RL, but the invention is not limited thereto. In an exemplary embodiment, the reference voltage line RL may be connected to a pad unit and may thus be provided with a different voltage from the common electrode CE1 and the sustain electrode line Cst, for example.

The sustain electrode line Cst may be disposed along the sides of the unit pixel UPX, and may also be disposed across the unit pixel UPX to divide the unit pixel UPX into upper and lower regions. More specifically, the sustain electrode line Cst may be disposed to extend in a horizontal direction across the unit pixel UPX and thus to divide the unit pixel UPX into the upper and lower regions.

Parts of the sustain electrode line Cst provided in the upper region and parts of the sustain electrode line Cst provided in the lower region may be separated from each other, and may be connected to each other via the reference voltage line RL.

With respect to the sustain electrode line Cst, which divides the unit pixel UPX into the upper and lower regions, a "1-1" wiring electrode LPE1 or a "2-1" wiring electrode LCE1 may be separated. More specifically, the "2-1" wiring electrode LCE-1 may include "2-1" vertical wiring electrodes V-LCE-1 and "2-1" horizontal wiring electrodes H-LCE1. The "2-1" vertical wiring electrodes V-LCE-1 and the "2-1" horizontal wiring electrodes H-LCE-1 may be separated from each other.

The "2-1" wiring electrode LCE-1 may be connected to the second TFT TR2, and thus, a "2-1" vertical wiring electrode V-LCE-1 and a "2-1" horizontal wiring electrode H-LCE-1 may be connected to the lower region of the unit pixel UPX, and particularly, a lower left part of the unit pixel UPX. Also, another "2-1" vertical wiring electrode V-LCE-1 and another "2-1" horizontal wiring electrode H-LCE-1 may be disposed in the upper region of the unit pixel UPX, and particularly, in an upper right part of the unit pixel UPX. The "2-1" vertical wiring electrodes V-LCE-1 and the "2-1" horizontal wiring electrodes H-LCE-1 in the upper right part and the lower left part of the unit pixel UPX may be connected to the reference voltage line RL via the fifth contact holes CH5 and may thus receive a common voltage.

The "1-1" wiring electrode LPE1 may include "1-1" vertical wiring electrodes V-LPE1 and "1-1" horizontal wiring electrodes H-LPE1. The "1-1" vertical wiring electrodes V-LPE1 and the "1-1" horizontal wiring electrodes H-LPE1 may be separated from each other.

The "1-1" wiring electrode LPE1 may be connected to the first TFT TR1, and thus, a "1-1" vertical wiring electrode V-LPE1 and a "1-1" horizontal wiring electrode H-LPE1 may be connected to the lower region of the unit pixel UPX, and particularly, a lower right part of the unit pixel UPX. Also, another "1-1" vertical wiring electrode V-LPE1 and another "1-1" horizontal wiring electrode H-LPE1 may be disposed in the upper region of the unit pixel UPX, and particularly, in an upper left part of the unit pixel UPX. The "1-1" vertical wiring electrodes V-LPE1 and the "1-1" horizontal wiring electrodes H-LPE1 in the lower right and upper left parts of the unit pixel UPX may be connected to "1-1" main electrodes MPE1 and may thus receive a pixel voltage.

The "1-1" main electrodes MPE1 and "2-1" main electrodes MCE1 may have similar arrangements to their respective counterparts of the previous exemplary embodiment. In the exemplary embodiment, unlike in the previous exemplary embodiment, the "1-1" main electrodes MPE1 and the "2-1" main electrodes MCE1 may be arranged such that the pitch between the "1-1" main electrodes MPE1 or between the "2-1" main electrodes MCE1 may vary from one region to another, and as a result, a high-level region and a low-level region may be provided. By forming both the high-level region and the low-level region in the unit pixel UPX, the side visibility of an LCD may be improved.

The pixel electrode PE1 may include "1-1" slit electrodes SPE1, which are arranged in a normal direction to the longitudinal direction of the "1-1" main electrodes MPE1, and the common electrode CE1 may include "2-1" slit electrodes SCE1, which are arranged in a normal direction to the longitudinal direction of the "2-1" main electrodes MCE1. The "1-1" slit electrodes SPE1 and the "2-1" slit electrodes SCE1 are almost identical to their respective counterparts of the previous exemplary embodiment, as illustrated in FIGS. 1 through 4, and thus, detailed descriptions will be omitted.

In the exemplary embodiment, two TFTs, i.e., the first TFT TR1 and the second TFT TR2, are provided in the unit pixel UPX, and a horizontal field is provided by applying different voltages to the pixel electrode PE1, which is the first electrode, and the common electrode CE1, which is the second electrode. Also, the "1-1" slit electrodes SPE1 and the "2-1" slit electrodes SCE1 are arranged in a staggered manner, thereby forming disclinations in the form of dots, rather than in the form of lines.

Accordingly, a wide viewing angle may be realized by providing the pixel electrode PE1 and the common electrode CE1 on different layers of the first substrate 105 so as to form a horizontal field therebetween, and the transmittance and the response speed of an LCD may be improved by arranging the "1-1" slit electrodes SPE1 and the "2-1" slit electrodes SCE1 in a staggered manner so as to control the formation of disclination lines.

Figure 9:
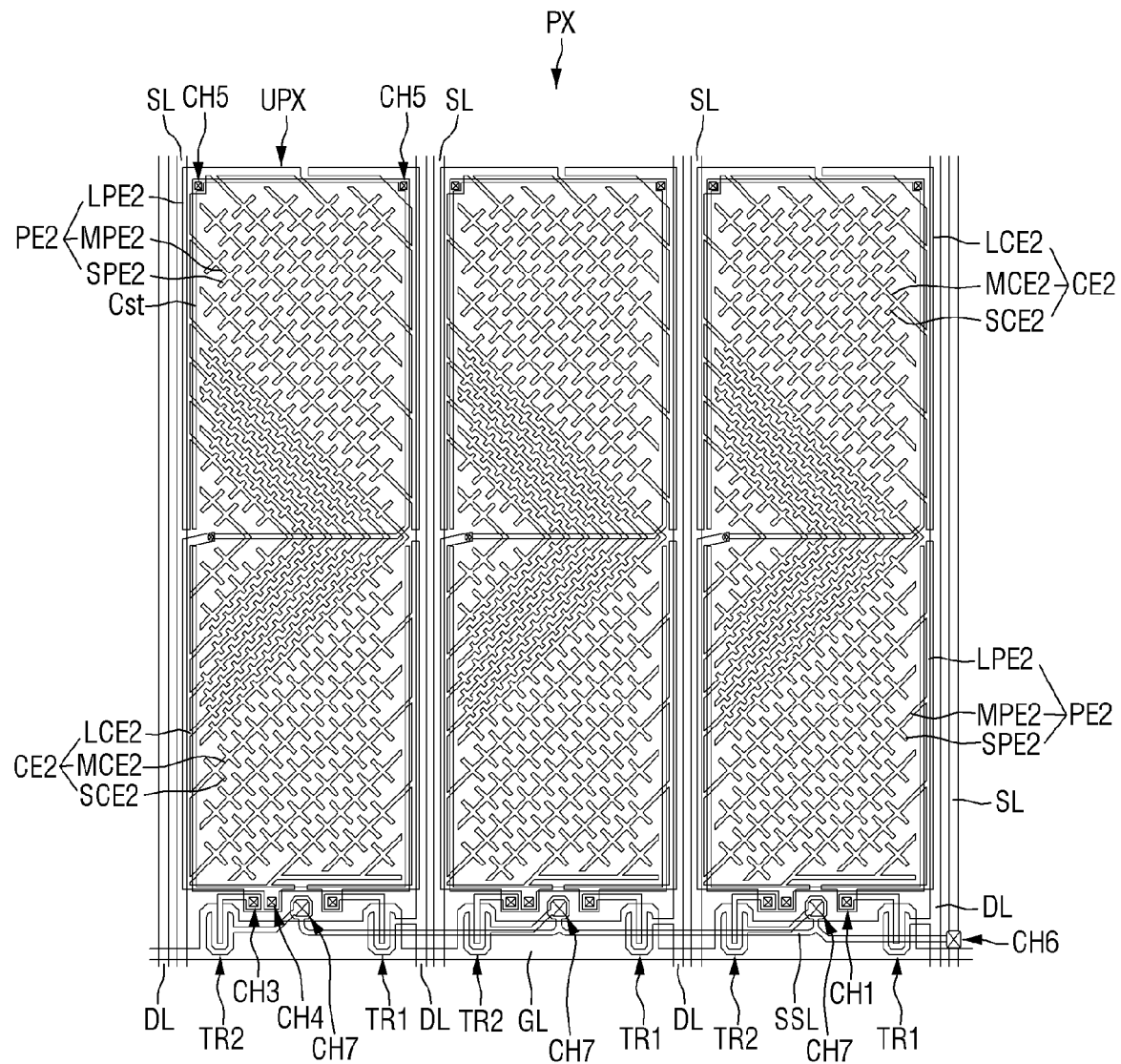
FIG. 9 is a plan view of an LCD according to another exemplary embodiment of the invention.

FIG. 9 is a plan view of an LCD according to another exemplary embodiment of the invention. For convenience, the LCD according to the exemplary embodiment will hereinafter be described with reference to FIG. 9 and with further reference to FIGS. 1 through 8, avoiding any redundant descriptions of the previous exemplary embodiments.

Referring to FIG. 9, a plurality of unit pixels UPX may be provided in a single pixel PX. In each of the unit pixels UPX, a signal line SL may be provided to extend in a direction parallel to a data line DL. The signal line SL may perform similar functions to those of a reference voltage line RL. The signal line SL may apply a common voltage to a sustain electrode line Cst, which is provided in each of the unit pixels UPX. To apply the same voltage to the unit pixels UPX, a connecting line SSL may be additionally provided to connect the signal line SL and a second TFT TR2 of each of the unit pixels UPX. More specifically, at least one signal line SL may be provided with a sixth contact hole CH6, and the connecting line SSL may be provided in the sixth contact hole CH6. The connecting line SSL may be disposed to extend in a direction parallel to a gate line GL.

The second TFT TR2 may be connected to a seventh contact hole CH7. The connecting line SSL may be connected to the seventh contact hole CH7, and thus, the same voltage may be applied to electrodes connected to the second TFT TR2.

The second TFT TR2 is provided in each of the unit pixels UPX, and is disposed to share the gate line GL with a first TFT TR1. Accordingly, in response to a gate-on signal being applied to apply a first voltage to a pixel electrode PE2, which is a first electrode, the second TFT TR2 may receive a gate-on signal, and thus, a second voltage may be applied to a common electrode CE2, which is a second electrode.

The first voltage and the second voltage may differ from each other, and may thus generate a potential difference. As a result, liquid crystal molecules 302 in each of the unit pixels UPX may be rotated.

"2-2" wiring electrodes LCE2 of the common electrode CE2, which is the second electrode connected to the second TFT TR2, may be isolated from one another. The "2-2" wiring electrodes LCE2 may be connected to the second TFT TR2, and may be provided in upper and lower regions of each of the unit pixels UPX. More specifically, the "2-2" wiring electrodes LCE2 may be disposed along a lower left side and an upper right side of each of the unit pixels UPX.

The upper and lower regions of each of the unit pixels UPX are spaced apart from each other by a predetermined distance, and the "2-2" wiring electrodes LCE2 are disposed to surround each of the unit pixels UPX. Accordingly, "2-2" main electrodes MCE2, which are branched off from the "2-2" wiring electrodes LCE2, may be disposed in the entire area of each of the unit pixels UPX. "1-2" wiring electrodes LPE2 may have a similar arrangement to the "2-2" wiring electrodes LCE2, and thus, a detailed description thereof will be omitted.

Second slit electrodes SCE2 may be provided on the "2-2" main electrodes MCE2, and first slit electrodes SPE2, which are branched off from "1-2" main electrodes MPE2, may be provided. By alternately arranging the "1-2" slit electrodes SCE2 and the "2-2" slit electrodes SPE2, the formation of disclination lines may be prevented, and thus, the response speed of an LCD may be improved.

In the exemplary embodiment, two TFTs, i.e., a first TFT TR1 and a second TFT TR2, are provided in each of the unit pixels UPX, and a horizontal field is provided by applying different voltages to the pixel electrode PE2, which is the first electrode, and the common electrode CE2, which is the second electrode. Also, the "1-2" slit electrodes SPE2 and the "2-2" slit electrodes SCE2 are arranged in a staggered manner, thereby forming disclinations in the form of dots, rather than in the form of lines.

Accordingly, a wide viewing angle may be realized by providing the pixel electrode PE2 and the common electrode CE2 on different layers of a first substrate so as to form a horizontal field therebetween, and the transmittance and the response speed of an LCD may be improved by arranging the "1-2" slit electrodes SPE2 and the "2-2" slit electrodes SCE2 in a staggered manner so as to control the formation of disclination lines.

FIGS. 10 through 14 are schematic views of the electrode structures of LCDs according to other exemplary embodiments of the invention.

The descriptions of the exemplary embodiments of FIGS. 1 through 9 are directly applicable to the exemplary embodiment of FIGS. 10 to 14. For convenience, the electrode structures of FIGS. 10 through 14 will hereinafter be described, taking the structure of the LCD of the exemplary embodiment of FIGS. 1 through 5 as an example, but the invention is not limited thereto.

A pixel electrode PE may include a first wiring electrode LPE, first main electrodes MPE, and first slit electrodes SPE, and a common electrode CE may include a second wiring electrode LCE, second main electrodes MCE, and second slit electrodes SCE. The first or second slit electrodes SPE or SCE may be arranged in various shapes.

Figure 10:
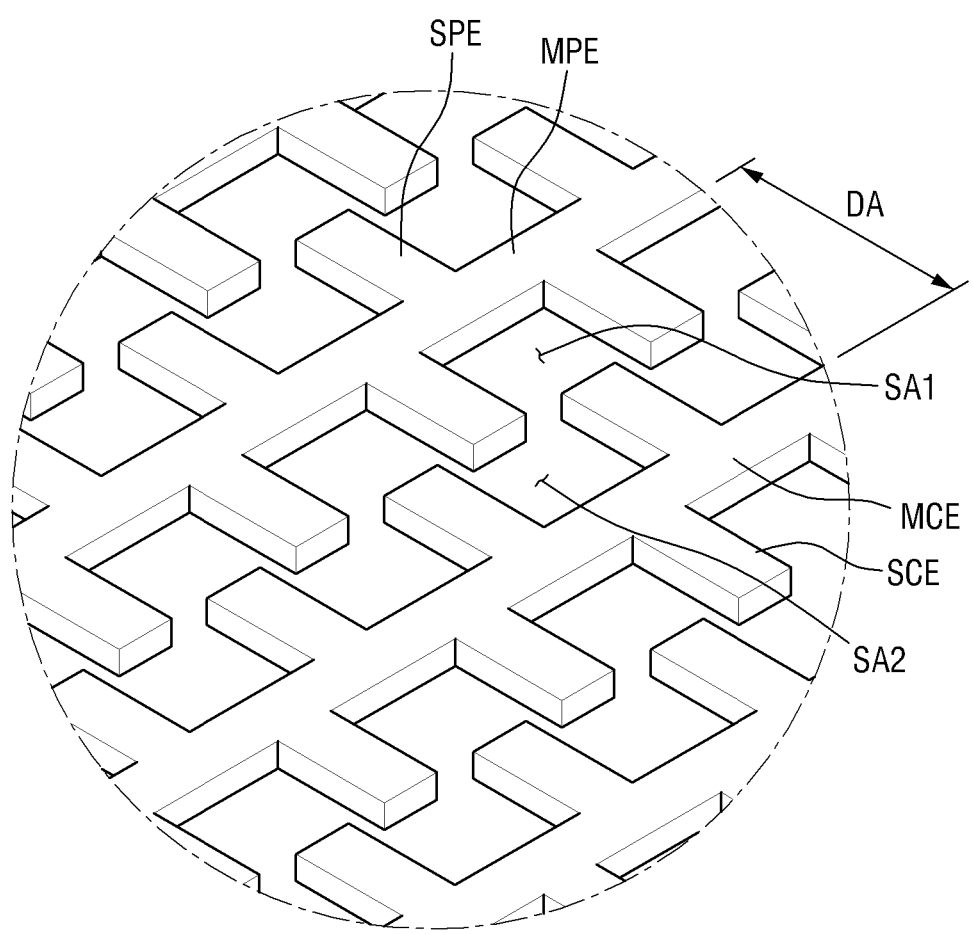
FIGS. 10 through 14 are schematic views of the electrode structures of LCDs according to other exemplary embodiments of the invention.

Referring to FIG. 10, the first or second slit electrodes SPE or SCE, which are branched off from the first or second main electrodes MPE or MCE, may be arranged in a normal direction to the longitudinal direction of the first or second main electrodes MPE or MCE.

The first or second slit electrodes SPE or SCE may be branched off from the first or second main electrodes MPE or MCE to be arranged in the normal direction to the longitudinal direction of the first or second main electrodes MPE or MCE. First or second slit electrodes SPE or SCE branched off from one side of each of the first or second main electrodes MPE or MCE and first or second slit electrodes SPE or SCE branched off from the other side of each of the first or second main electrodes MPE or MCE may be arranged in a staggered manner with respect to the longitudinal direction of the first or second main electrodes MPE or MCE.

Figure 11:
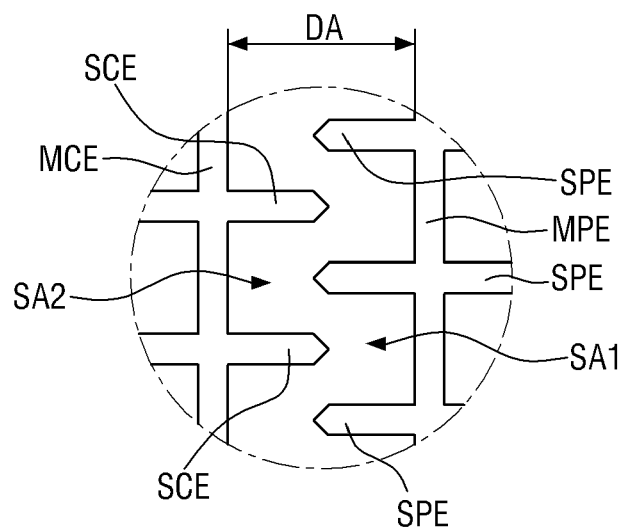
Figure 12:
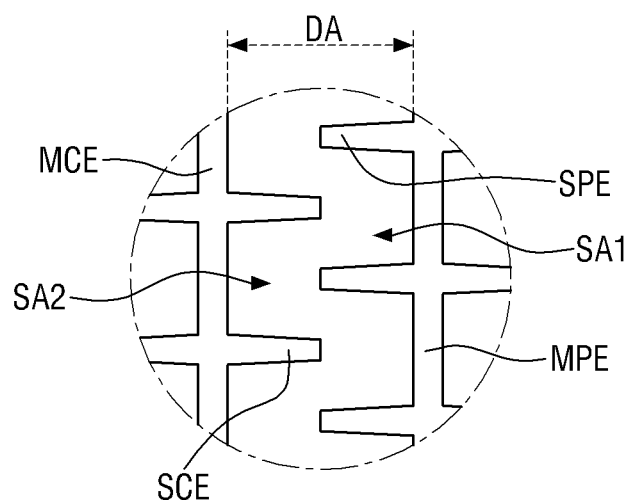
Figure 13:
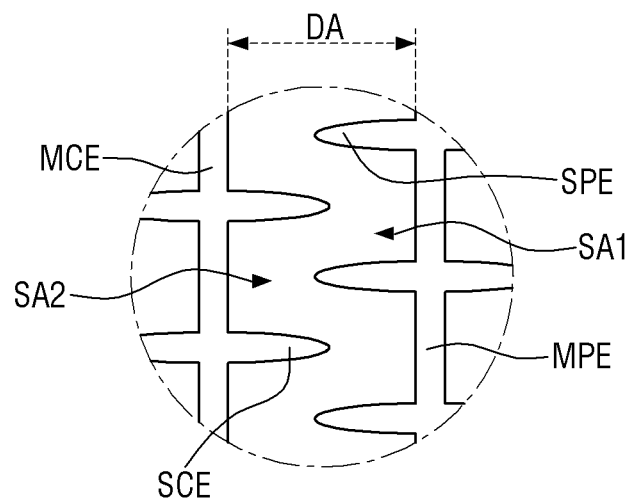
Figure 14:
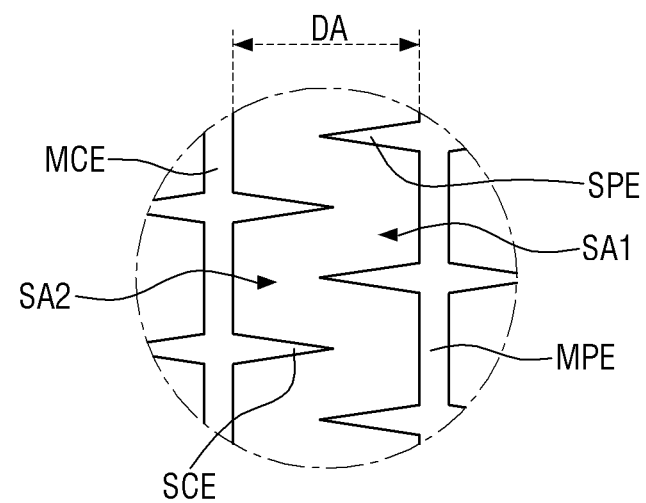

Referring to FIGS. 11 through 14, first or second slit electrodes SPE or SCE may be defined in various shapes. That is, the first or second slit electrodes SPE or SCE may be defined in a polygonal shape, a round shape, or the like. More specifically, as illustrated in FIG. 11, an end portion of each of the first or second slit electrodes SPE or SCE may be chamfered into a triangular shape, for example. In an alternative exemplary embodiment, as illustrated in FIG. 12, each of the first or second slit electrodes SPE or SCE may be patterned into a trapezoidal shape with slanting sides, for example. In an alternative exemplary embodiment, as illustrated in FIG. 13, the end portion of each of the first or second slit electrodes SPE or SCE may be provided into a round shape, for example. In an alternative exemplary embodiment, as illustrated in FIG. 14, each of the first or second slit electrodes SPE or SCE may be provided into a triangular shape, for example.

When each of the first or second slit electrodes SPE or SCE is provided into a triangular shape, a round shape, or a trapezoidal shape by partially removing each of the first or second slit electrodes SPE or SCE, as illustrated in FIGS. 11 through 14, the distance between the first slit electrodes SPE and the second slit electrodes SCE may increase.

More specifically, for example, in the LCD of FIG. 1, the first slit electrodes SPE and the second slit electrodes SCE are only a short distance apart from each other. The first slit electrodes SPE and the second slit electrodes SCE may be further apart from each other in the exemplary embodiments of FIGS. 11 through 14 than in the exemplary embodiment of FIG. 1.

By changing the shape of the end portion of each of the first or second slit electrodes SPE or SCE, the distance between the first slit electrodes SPE and the second slit electrodes SCE may be varied, and as a result, the formation of disclinations and the response speed of an LCD may also be varied.

In the exemplary embodiments of FIGS. 11 through 14, the formation of disclinations may be controlled by changing the shapes of the first or second slit electrodes SPE or SCE so as to control the distance between the first slit electrodes SPE and the second slit electrodes SCE, and as a result, the transmittance and the response speed of an LCD may be improved.

Tables 1 and 2 below are for comparing the response speed and the transmittance of LCDs according to exemplary embodiments 1 and 2 with the response speed and the transmittance of LCDs according to comparative examples 1 and 2. An LCD according to exemplary embodiment 1 corresponds to an LCD according to the exemplary embodiment of FIG. 1, and an LCD according to comparative example 1 corresponds to the LCD according to exemplary embodiment 1 except that it does not include any slit electrodes SPE and SCE.

An LCD according to exemplary embodiment 2 corresponds to an LCD according to the exemplary embodiment of FIG. 6, and an LCD according to comparative example 2 corresponds to the LCD according to exemplary embodiment 2 except that it does not include any slit electrodes SPE and SCE.

TABLE 1

| | Comparative Example 1 | Comparative Example 2 | Embodiment 1 | Embodiment 2 |
| --- | --- | --- | --- | --- |
| Response Speed On (Rising) | 10.1 ms | 10.4 ms | 6.6 ms | 4.3 ms |
| Response Speed Off (Falling) | 5.0 ms | 5.3 ms | 3.8 ms | 2.4 ms |
| Transmittance Decrease | 6.2% | 6.0% | 6.4% | 5.9% |
| Bruising | Yes | Yes | No | No |
| Surface Image Sticking (64 gray) | 26 g | 28 g | 24 g | 12 g |

TABLE 2

| Liquid Crystal | Comparative Example 1 | Comparative Example 2 | Embodiment 1 | Embodiment 2 |
| --- | --- | --- | --- | --- |
| Rotational Viscosity (mPa · s) | 130 | 130 | 130 | 100 |
| Dielectric Anisotropy | 15.0 | 15.0 | 15.0 | 9.0 |

Referring to Tables 1 and 2, a liquid crystal material having a rotational viscosity of 130 milipascal seconds (mPa·s) was used in comparative examples 1 and 2, and a liquid crystal material having a rotational viscosity of 130 mPa·s and a liquid crystal material having a rotational viscosity of 100 mPa·s were used in exemplary embodiments 1 and 2, respectively. The dielectric anisotropy of the liquid crystal material used in comparative examples 1 and 2 was 15.0, and the dielectric anisotropy of the liquid crystal materials used in exemplary embodiments 1 and 2 was 15.0 and 9.0, respectively.

The rising response speeds of the LCDs according to exemplary embodiments 1 and 2 were measured to be about 6.6 milliseconds (ms) and about 4.3 ms, respectively. The rising response speeds of the LCDs according to comparative examples 1 and 2 were measured to be about 10.1 ms and about 10.4 ms, respectively.

The falling response speeds of the LCDs according to exemplary embodiments 1 and 2 were measured to be about 3.8 ms and about 2.4 ms, respectively. The falling response speeds of the LCDs according to comparative examples 1 and 2 were measured to be about 5.0 ms and about 5.3 ms, respectively. That is, the LCDs according to exemplary embodiments 1 and 2 have an improved response speed, compared to the LCDs according to comparative examples 1 and 2.

This may be because in the LCDs according to exemplary embodiments 1 and 2, first or second slit electrodes SPE or SCE are arranged in a normal direction to the longitudinal direction of first or second main electrodes MPE or MCE, thereby forming disclinations in the shape of dots, rather than in the shape of lines, and facilitating the movement of liquid crystal molecules 302.

Bruising was detected from the LCDs according to comparative examples 1 and 2, but not from the LCDs according to exemplary embodiments 1 and 2. This may also be because the arrangement of the first or second slit electrodes SPE or SCE in the normal direction to the longitudinal direction of the first or second main electrodes MPE or MCE leads to the formation of disclinations in the form of dots, rather than in the form of lines.

Surface image sticking measurements from the LCDs according to comparative examples 1 and 2 were 26 gray (g) and 28 g, respectively, and reduced surface image sticking measurements of 24 g and 12 g were obtained from the LCDs according to exemplary embodiments 1 and 2, respectively.

Contrary to the expectation that the transmittance of the LCDs according to exemplary embodiments 1 and 2 would decrease because the area of electrodes increased due to the addition of the first slit electrodes SPE and the second slit electrodes SCE, the transmittance of the LCDs according to exemplary embodiments 1 and 2 was improved from the transmittance of the LCDs according to comparative examples 1 and 2, which was 6.4 percent (%) and 5.9%, respectively, to 6.4% and 5.9%, respectively.

This may be interpreted that the transmittance of the LCDs according to exemplary embodiments 1 and 2 were improved because the presence of the first slit electrodes SPE and the second slit electrodes SCE suppressed the formation of disclinations, formed disclinations in the shape of dots, and thus facilitated the movement of the liquid crystal molecules 302. That is, the transmittance of an LCD may be improved by suppressing the formation of disclinations so as to facilitate the movement of liquid crystal molecules.

However, the effects of the invention are not restricted to the one set forth herein. The above and other effects of the invention will become more apparent to one of daily skill in the art to which the invention pertains by referencing the claims.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A liquid crystal display comprising:
    a first substrate including a thin-film transistor, which is disposed in a unit pixel, a first electrode, which is connected to the thin-film transistor, and a second electrode, which is disposed on the same layer as that on which the first electrode is disposed;
    a second substrate facing the first substrate; and
    a liquid crystal layer including liquid crystal molecules, which are disposed between the first and second substrates,
    wherein the first and second electrodes are provided with different voltages from each other and include a first wiring electrode and a second wiring electrode, respectively, which are disposed on sides of the unit pixel, first main electrodes and second main electrodes, respectively, which are branched off from the first wiring electrode or the second wiring electrode in a first direction and are arranged in a staggered manner, and first slit electrodes and second slit electrodes, respectively, which are arranged in a second direction perpendicular to the first direction and are arranged in a staggered manner.

2. The liquid crystal display of claim 1, further comprising:
    a first polarizing plate disposed on a first side surface of the first substrate where the thin-film transistor is disposed; and
    a second polarizing plate disposed on a first side surface of the second substrate, which is opposite to on a second side surface of the second substrate facing the liquid crystal layer,
    wherein the first and second polarizing plates are arranged such that polarization axes of the first and second polarizing plates cross each other at right angles, and the first main electrodes and the second main electrodes extend in a direction of about 40 degrees to about 50 degrees with respect to the polarization axes of the first and second polarizing plates.

3. The liquid crystal display of claim 1, wherein at least one of the first and second electrodes includes at least one of indium zinc oxide, indium tin oxide, indium gallium zinc oxide, and a combination thereof.

4. The liquid crystal display of claim 1, wherein the thin-film transistor includes:
    a gate line disposed in a third direction of the unit pixel;
    a gate electrode disposed in an area in which the gate line and a data line intersect each other and extending from the gate line; and
    a source electrode extending from the data line and a drain electrode isolated from the source electrode, and
    the drain electrode is connected to the first electrode via a contact hole.

5. The liquid crystal display of claim 4, wherein the first wiring electrode of the first electrode includes:
    a first vertical wiring electrode, which is disposed along a first side of the unit pixel and extends in parallel to the data line; and
    a first horizontal wiring electrode, which is branched off from the first vertical wiring electrode, extends in parallel to the gate line, and divides the unit pixel into upper and lower regions.

6. The liquid crystal display of claim 5, wherein the first main electrodes extend from the first horizontal wiring electrode and first main electrodes extending upwardly from the first horizontal wiring electrode and first main electrodes extending downwardly from the first horizontal wiring electrode are arranged in a staggered manner.

7. The liquid crystal display of claim 4, wherein the second wiring electrode of the second electrode includes:
    a second vertical wiring electrode, which is disposed along a second side of the unit pixel and extends in parallel to the data line, and
    second horizontal wiring electrodes, which extend from the second vertical wiring electrode in parallel to the gate line, and
    the second horizontal wiring electrodes are disposed adjacent to the gate line and are respectively located above and below the gate line.

8. The liquid crystal display of claim 7, wherein the second main electrodes extend from the second horizontal wiring electrode and second main electrodes extending upwardly from the second horizontal wiring electrode and second main electrodes extending downwardly from the second horizontal wiring electrode are arranged in a staggered manner.

9. The liquid crystal display of claim 1, wherein a plurality of first main electrodes and a plurality of second main electrodes are provided and are alternately arranged and are spaced apart from each other by a predetermined distance so as to include isolation areas therebetween.

10. The liquid crystal display of claim 1, wherein the first slit electrodes and the second slit electrodes are alternately arranged, first slit areas, which isolate the first slit electrodes from one another, are disposed among the first slit electrodes, the second slit electrodes are disposed in areas corresponding to the first slit areas, second slit areas, which isolate the second slit electrodes from one another, are disposed among the second slit electrodes, and the first slit electrodes are disposed in areas corresponding to the second slit areas.

11. The liquid crystal display of claim 1, wherein the length of at least one of the first and second main electrodes varies depending on a size of the unit pixel and is in a range of about 1 micrometers to about 200 micrometer.

12. The liquid crystal display of claim 1, wherein a pitch of the first main electrodes and the second main electrodes is in a range of about 2 micrometers to about 20 micrometers.

13. The liquid crystal display of claim 1, wherein a line width of the first main electrodes and the second main electrodes is in a range of about 0.1 micrometer to about 5 micrometers.

14. The liquid crystal display of claim 1, wherein a line width of at least one of the first and second slit electrodes is in a range of about 0.1 micrometer to about 5 micrometers.

15. The liquid crystal display of claim 1, wherein a pitch of the first slit electrodes and the second slit electrodes is in a range of about 0.1 micrometer to about 20 micrometers.

16. The liquid crystal display of claim 1, wherein a length of the first slit electrodes and the second slit electrodes is in a range of about 0.5 micrometer to about 18 micrometers.

17. The liquid crystal display of claim 1, wherein the first slit electrodes and the second slit electrodes are arranged symmetrically with respect to an imaginary normal line to the first direction in which at least one of the first main electrodes and the second main electrodes extend.

18. The liquid crystal display of claim 1, wherein the first slit electrodes and the second slit electrodes are alternately arranged with respect to an imaginary normal line to the first direction in which at least one of the first main electrodes and the second main electrodes extend.

19. The liquid crystal display of claim 1, wherein the first slit electrodes and the second slit electrodes have end portions thereof chamfered.

20. The liquid crystal display of claim 1, wherein at least one of the first and second polarizing plates is a wire grid polarizing plate in which metal patterns are arranged.

* * * * *